(12) United States Patent
Misorski et al.

(10) Patent No.: US 7,905,992 B1
(45) Date of Patent: Mar. 15, 2011

(54) SUBMERGED SURFACE WITH CONDUCTIVE NANOPARTICLES

(75) Inventors: Christopher J. Misorski, Fond du Lac, WI (US); Kevin R. Anderson, Fond du Lac, WI (US); Erica D. Blizil, Rosendale, WI (US); Scott M. Olig, Oshkosh, WI (US)

(73) Assignee: Brunswick Corporation, Lake Forest, IL (US)

( * ) Notice: Subject to any disclaimer, the term of this patent is extended or adjusted under 35 U.S.C. 154(b) by 784 days.

(21) Appl. No.: 11/827,727

(22) Filed: Jul. 13, 2007

(51) Int. Cl.
*C23F 13/06* (2006.01)
*C23F 13/12* (2006.01)

(52) U.S. Cl. ......... 204/196.18; 204/196.37; 204/196.07; 204/196.04; 204/196.01

(58) Field of Classification Search .............. 204/196.01, 204/196.04, 196.07, 196.18, 196.37
See application file for complete search history.

(56) References Cited

U.S. PATENT DOCUMENTS

| | | | |
|---|---|---|---|
| 6,173,669 B1 | 1/2001 | Staerzl | 114/222 |
| 6,209,472 B1 | 4/2001 | Staerzl | 114/222 |
| 6,514,401 B2 | 2/2003 | Chyou et al. | 205/739 |
| 6,547,952 B1 | 4/2003 | Staerzl | 205/724 |
| 6,572,997 B1 | 6/2003 | Iqbal et al. | 429/34 |
| 6,670,607 B2 | 12/2003 | Wood et al. | 250/288 |
| 6,844,567 B2 | 1/2005 | Talroze et al. | 257/40 |
| 6,919,063 B2 | 7/2005 | Jang et al. | 423/ 445 B |
| 6,936,653 B2 | 8/2005 | McElrath et al. | 524/496 |
| 6,973,890 B1 | 12/2005 | Staerzl | 114/67 R |
| 6,986,853 B2 | 1/2006 | Glatkowski et al. | 264/36.19 |
| 7,011,884 B1 | 3/2006 | Chow et al. | 428/367 |
| 7,025,013 B1 | 4/2006 | Staerzl et al. | 114/222 |
| 7,109,136 B2 | 9/2006 | Senecal et al. | 442/347 |
| 7,131,877 B1 | 11/2006 | Staerzl | 440/76 |
| 7,147,966 B2 | 12/2006 | Ren et al. | 429/209 |
| 7,211,173 B1 | 5/2007 | Staerzl et al. | 204/196.37 |
| 7,629,071 B2 * | 12/2009 | Liu et al. | 429/434 |
| 2004/0115416 A1* | 6/2004 | Nonninger et al. | 428/304.4 |
| 2004/0231975 A1* | 11/2004 | Boyd et al. | 204/196.18 |
| 2006/0172179 A1* | 8/2006 | Gu et al. | 429/44 |
| 2010/0083893 A1* | 4/2010 | Staerzl | 114/382 |

* cited by examiner

*Primary Examiner* — Bruce F Bell
(74) *Attorney, Agent, or Firm* — William D. Lanyi

(57) ABSTRACT

An electrically conductive surface of a submerged object comprises a polymer matrix, such as a resin, with a plurality of electrically conductive nanoparticles suspended within the polymer. The nanoparticles are preferably smaller than 100 nanometers in their minimum dimension. In addition, large electrically conductive particles can be suspended in the polymer. The larger particles are typically greater than 300 nanometers in minimum dimension. The larger particles can comprise carbon powder or fibers. The electrically conductive nanoparticles, which can be nanotubes or ferrules, for example, and the larger particles, which can be carbon powder or fibers, are suspended homogeneously within the polymer matrix for best results and most uniform electrical conduction through the thickness of the composite layer.

5 Claims, 3 Drawing Sheets

SUBMERGED SURFACE WITH CONDUCTIVE NANOPARTICLES

BACKGROUND OF THE INVENTION

1. Field of the Invention

The present invention relates generally to electrically conductive surfaces that are submerged and, more particularly, to submerged surfaces that conduct electricity for the purpose of generating electrochemical changes near the surface to inhibit the growth of marine organisms.

2. Description of the Related Art

Those skilled in the art of marine vessel design and other submerged surfaces are familiar with techniques that can be used to inhibit the growth of marine organisms on those surfaces. It is known that, in sea water, electrolysis can be used to create gaseous chlorine on or near the surfaces of submerged devices, such as boat hulls or grates used in conjunction with submerged intake pipes. The chlorine discourages the growth of marine organisms on those surfaces.

U.S. Pat. No. 6,173,669, which issued to Staerzl on Jan. 16, 2001, discloses an apparatus and method for inhibiting fouling of an underwater surface. The fouling prevention system comprises two conductive surfaces and a device that alternates the direction of electric current between the two surfaces. The current is caused to flow through sea water in which the two surfaces are submerged or partially submerged. A monitor measures the current flowing from one of the two conduction surfaces and compares it to the current flowing into the other conductive surface to assure that no leakage of current of substantial quantity exists.

U.S. Pat. No. 6,209,472, which issued to Staerzl on Apr. 3, 2001, discloses an apparatus and method for inhibiting fouling of an underwater surface. The system for inhibiting marine organism growth on underwater surfaces provides an electric current generator which causes an electric current to flow proximate the underwater surface. A source of power, such as a battery, provides electrical power to the electric current generator. The flow of current passes from the underwater surface through the water surrounding the surface or in contact with the surface, and a point of ground potential. The point of ground potential can be a marine propulsion system attached to a boat on which the underwater surface is contained.

U.S. Pat. No. 6,514,401, which issued to Chyou et al. on Feb. 4, 2003, describes an anti-biofouling system. The system is adapted to be used for an underwater structure immersed in seawater. The anti-biofouling system includes a conductive layer, comprising carbon or graphite fiber, carbon or graphite powder, and binder, formed on a surface of the underwater structure for serving as an anode, a cathode, and a power supply for providing a current, thereby performing an electrolytic reaction for the anti-biofouling system such that a fouling organism is prohibited from attaching on the surface of the underwater structure.

U.S. Pat. No. 6,547,952, which issued to Staerzl on Apr. 15, 2003, discloses a system for inhibiting fouling of an underwater surface. An electrically conductive surface is combined with a protective surface of glass in order to provide an anode from which electrons can be transferred to seawater for the purpose of generating gaseous chlorine on the surface to be protected. Ambient temperature cure glass (ATC glass) provides a covalent bond on an electrically conductive surface, such as nickel-bearing paint. In this way, boat hulls, submerged portions of outboard motors, and submerged portions of sterndrive systems can be protected effectively from the growth of marine organisms, such as barnacles.

U.S. Pat. No. 6,572,997, which issued to Iqbal et al. on Jun. 3, 2003, describes nanocomposites for fuel cell bipolar plates. An electrically conductive flow field plate in a proton exchange membrane fuel cell comprises a composition made of a resin and a plurality of carbon nanotubular fibers having an average diameter which is at least about 0.5 nm and up to about 300 nm. The carbon nanotubular fibers are present at not more than about 85 wt. %. The resin can be of a thermoplastic type, a fluorinated type, a thermosetting type, and a liquid crystalline type.

U.S. Pat. No. 6,844,567, which issued to Talroze et al. on Jan. 18, 2005, describes conductive polymer materials and methods of their manufacture and use. Quantum nanowires are produced in a medium comprising ions, dopants and free electrons, wherein the free electrons are celebrated by complexes of ions and dopants. Electrical conductivity of the quantum nanowires can be higher than for conventional metal conductors.

U.S. Pat. No. 6,919,063, which issued to Jang et al. on Jul. 19, 2005, describes carbon nanoparticles and methods of preparing the same. The invention relates to a novel carbon nanoparticle and a novel method of preparing the same and a transparent, conductive polymer composite containing the same. The carbon nanoparticle has the mean diameter of 1 through 50 nm and the shape of a sphere, rod, or others, which is a novel material not known in the relevant art. The carbon nanoparticle has the excellent electric conductivity and the ferromagnetic property and can be made by a novel, low-cost method entirely different from those of fullerene and carbon nanotube.

U.S. Pat. No. 6,670,607, which issued to Wood et al. on Dec. 30, 2003, describes a conductive polymer coated nano-electrospray emitter. The emitter includes an emitter body which includes a fluid inlet, an outlet orifice, and a passage communicating between the fluid inlet and outlet orifice.

U.S. Pat. No. 6,936,653, which issued to McElrath et al. on Aug. 30, 2005, describes composite materials comprising polar polymers and single-wall carbon nanotubes. The invention relates to a composite comprising a weight fraction of single-wall carbon nanotubes and at least one polar polymer wherein the composite has an electrical and/or thermal conductivity enhanced over that of the polymer alone.

U.S. Pat. No. 6,973,890, which issued to Staerzl on Dec. 13, 2005, discloses a self-adaptive system for an apparatus which inhibits fouling of an underwater surface. The system is provided which automatically calibrates the marine fouling prevention system. It responds to movements between fresh and saltwater bodies of water, detects damage to the hull or other submerged surfaces, and responds to the use of the fouling prevention system with different sizes of marine vessels.

U.S. Pat. No. 6,986,853, which issued to Glatkowski et al. Jan. 17, 2006, describes carbon nanotube fiber reinforced composite structures for electromagnetic and lightening strike protection. A method for repairing fiber reinforced composite structures while maintaining original electromagnetic and lightening protection using carbon nanotubes, fibers, and thermoset resins is described.

U.S. Pat. No. 7,011,884, which issued to Chow et al. on Mar. 14, 2006, describes a carbon nanotube with a graphitic outer layer. A method for manufacturing carbon nanotubes with an integrally attached outer carbon layer is disclosed. The graphitic layer improves the ability to handle and manipulate the nanometer size nanotube device in various applications, such as a probe tip in scanning probe microscopes and optical microscopes, or as an electron emitting device.

U.S. Pat. No. 7,025,013, which issued to Staerzl et al. on Apr. 11, 2006, discloses a multilayered submersible structure with fouling inhibiting characteristics. The structure has an outer coating that is disposed in contact with water in which the structure is submerged, the current distribution layer or charge distribution layer, an electrical conductor connectable in electrical communication to a source of electrical power, and a support structure.

U.S. Pat. No. 7,109,136, which issued to Senecal et al. on Sep. 19, 2006, describes conductive polymer membrane articles and methods for producing the same. It comprises a non-woven membrane of polymer fibers, wherein at least some of the fibers have diameters of less than one micron.

U.S. Pat. No. 7,131,877, which issued to Staerzl on Nov. 7, 2006, discloses a method for protecting a marine propulsion system. An electrically conductive coating is provided on a housing structure of a marine propulsion system. By impressing a current on the electrically conductive coating, which can be a polymer material, the housing structure is used as an anode in a cathodic protection system. In addition, the use of the electrically conductive coating on the housing structure as an anode inhibits the growth of marine fouling on the outer surface of the housing structure by forming chlorine gas in a saltwater environment and by forming an acidic water layer near the surface in a non-saltwater environment.

U.S. Pat. No. 7,147,966, which issued to Ren et al. on Dec. 12, 2006, describes coated carbon nanotube array electrodes. The conductive carbon nanotube (CNT) electrode materials comprise aligned CNT substrates coated with an electrically conductive polymer, and the fabrication of electrodes for use in high performance electrical energy storage devices. In particular, the present invention provides CNT material whose electrical properties render them especially suitable for use in high efficiency rechargeable batteries.

U.S. Pat. No. 7,211,173, which issued to Staerzl et al. on May 1, 2007, discloses a system for inhibiting fouling of an underwater surface. The system comprises first and second conductors which are made of a polymer matrix, such as vinyl ester, and a suspended conductor, such as carbon powder or particles. This type of conductive material is formed to provide two sections of a boat hull so that a source of electrical current can be used to reversibly cause an electric current to flow to and from the conductive coatings. The conductive coatings are electrically insulated from each other in order to force the formation of an electrical circuit which includes the two conductive coatings, the source of electrical current, and the water in which the boat hull is disposed. This results in the creation of chlorine bubbles on the conductive surfaces. Chlorine bubbles on the boat hull surfaces discourage the formation of marine growth, such as barnacles.

The patents described above are hereby expressly incorporated by reference in the description of the present invention.

Various types of nanoparticles have been developed and used in recent years. It has been discovered that nanoparticles exhibit improved characteristics, such as conductivity, in comparison to larger particles of the same material. In addition, many different systems for inhibiting biofouling on submerged surfaces have been developed. Since the beginning of the $20^{th}$ century, it has been known that the electrolytic creation of various gases, such as chlorine, discourages the growth of marine organisms on submerged surfaces. However, during almost a century of development, an efficient, cost effective, and robust system for discouraging marine growth without the use of poisons has proved difficult to achieve. It would therefore be significantly beneficial if a system could be provided to efficiently create electrically conductive surfaces that operate in an effective and robust manner to discourage biofouling on submerged surfaces.

SUMMARY OF THE INVENTION

An object having a surface that is submergible and made in accordance with a preferred embodiment of the present invention comprises a support structure and a layer disposed on the support structure which has a surface that is disposable in contact with water when the object is submerged, wherein the layer comprises a binder and a plurality of electrically conductive nanoparticles suspended within the binder. The binder can be a polymer matrix. The plurality of electrically conductive nanoparticles can comprise a plurality of carbon nanotubes, a plurality of carbon ferrules, or a plurality of electrically conductive ceramic nanoparticles. Other conductive nanoparticles are also possible to use in conjunction with the present invention. The binder can be an electrically conductive polymer, such as an electrically conductive gel coat material. The support structure can be the hull of a marine vessel or an intake grate of a submerged water pipe. Other submerged objects can also be made according to the principles of the present invention. The layer can further comprise a plurality of larger conductive particles suspended within the binder. These particles, which are used in addition to and in combination with the nanoparticles, have a minimum dimension greater than 100 nanometers. These conductive particles can comprise carbon fiber or carbon powder. Alternatively, other types of electrically conductive particles can be used in conjunction with alternative embodiments of the present invention. In a particularly preferred embodiment of the present invention, it can further comprise a charge distribution member, or layer, disposed within the binder. The charge distribution member can comprise a carbon mat or an electrically conductive mesh or screen material. In a preferred embodiment of the present invention, each of the plurality of electrically conductive nanoparticles has a minimum dimension which is less than 100 nanometers.

BRIEF DESCRIPTION OF THE DRAWINGS

The present invention will be more fully and clearly understood from a reading of the description of the preferred embodiment in conjunction with the drawings, in which.

DESCRIPTION OF THE PREFERRED EMBODIMENT

Figure 1:
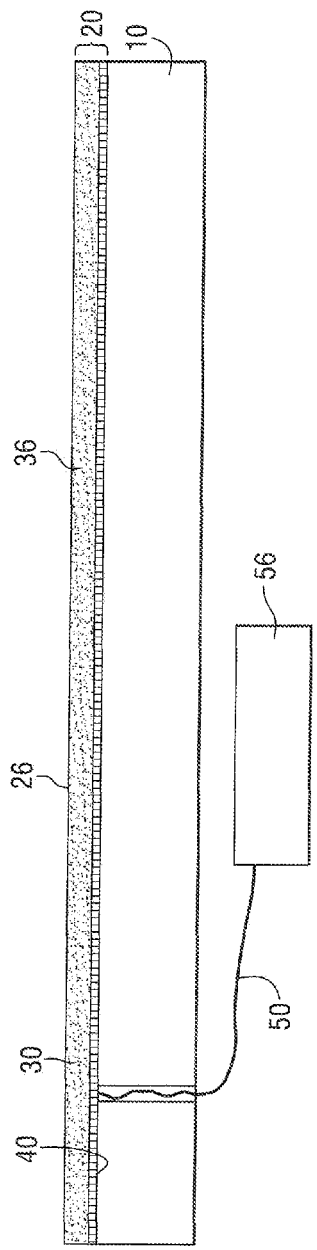
FIG. 1 is a section view of a hull of a marine vessel showing a support structure and a conductive layer.

Throughout the description of the preferred embodiment of the present invention, like components will be identified by like reference numerals.

One purpose of the present invention is to improve the operation of an electrically conductive submerged surface that is periodically caused to conduct an electric current in order to change the chemical or ionic character of water which is in contact with the submerged surface. In saltwater, this type of system produces gaseous chlorine at the submerged surface. In freshwater, the acidity of the water proximate the submerged surface is affected. In both cases, biofouling is discouraged.

In the patents described above, the basic concept of suspending electrically conductive particles in a polymer matrix is described. The polymer matrix can be a conductive polymer, such as an electrically conductive gel coat, or can be a non-conductive polymer which is made conductive only because of the suspension of conductive particles within it. The conductive particles can be carbon powder, fiber, or other forms of conductive material.

The binder, with the suspended conductive particles, can be sprayed onto a surface or otherwise deposited on the surface. For example, in the manufacture of a boat hull, the binder can be sprayed onto a boat hull mold and subsequent supporting layers of fiberglass can be later placed on this initial outer conductive layer. Many different alternatives are possible.

When electrically conductive particles, such as carbon powder or fiber, are suspended within a polymer matrix, the conductive path through the layer is not always uniformly conductive. Electric current can find some paths much less resistive than others. This can be caused by a non-uniform distribution of the conductive particles within a generally non-conductive polymer material. In addition, the conductive particles can be completely coated by a non-conductive polymer coating which, in effect, insulates and isolates the individual conductive is particles from other conductive particles and, as a result, increases the resistance of the current path through the thickness of the layer to the water in which the layer is submerged. The non-uniformity or non-homogeneity of the mixture of electrically conductive particles within the polymer matrix can cause localized "hot spots" that conduct most of the current through the thickness of the conductive layer. As described below, this can result in a reduced useful life of the conductive layer.

In the prior art discussed above, the use of an electrically conductive media in a resin layer of a boat hull is described. The conductive media is used to carry and distribute electrical energy from a source of electrical power to the water in which the surface is submerged. The conductive media, described in the patents above, can comprise a carbon fiber-based material which can be sprayed onto a mold or onto a surface of a boat. Alternatively, a woven mat can be soaked in the carbon-bearing polymer and applied to a mold to form the hull of a boat. Various different manufacturing techniques are described in the patents disclosed above. Some of these techniques have revealed a tendency to suffer premature burn-out during operation. This phenomenon occurs after the resistance of the conductive path eventually becomes too large for a 12-volt power supply to provide sufficient energy to create a current density at the submerged surface of 35 milliamperes per square foot of surface area. The conductive particles in the submerged surface must be sufficiently operable to conduct electrons through the thickness of the conductive layer and to discharge electrons into the surrounding water at a sufficient current density to have the desired effect while not being oxidized themselves. If they oxidize, they become less efficient and exacerbate the situation by increasing the resistance which leads to further oxidation. In order to achieve the required current density, the electric current that flows from each exposed portion of each carbon fiber depends on the amount of fibers that are exposed at the submerged surface. If a sufficiently high level of exposed fiber is available, the is amount of electric current that each region of the surface must carry is sufficiently low to avoid burn-out. Alternatively, if an insufficient amount of carbon particles are available at the surface, the localized current density at each fiber or particle is sufficiently high that the fibers eventually oxidize and result in a burn-out or oxidation of the carbon particles in that specific localized region. One potential solution to this problem could be the use of more electrically conductive particles suspended in the polymer matrix. However, this solution does not guarantee that the particles are uniformly and homogeneously distributed throughout the entire conductive surface.

The present invention proposes the use of electrically conductive nanoparticles suspended in the polymer matrix, or binder. The overall system, with the sources of electric power, the various layers of structural support, and the other techniques used in making an electrically conductive boat hull or submerged object, are generally similar to the techniques described in the patents identified above. The primary advantage of the present invention is that it uses electrically conductive nanoparticles suspended in the binder. The other portions of the systems are intended to be basically similar to those described in the patents identified above.

FIG. 1 is a schematic representation of a section taken through a portion of a boat hull. It comprises a supporting structure 10 which can be fiberglass or any other material that is sufficient to provide the basic hull of a marine vessel. A layer 20 is disposed on the support structure 10. The layer has a surface 26 which is to disposable in contact with water when the object is submerged. The layer comprises a binder 30 and a plurality of electrically conductive nanoparticles 36 suspended within the binder. In the embodiment shown in FIG. 1, a charge distribution layer 40 is included within the layer 20. As described in greater detail in some of the patents identified above, particularly U.S. Pat. No. 7,025,013, charge distribution layers are used to provide an efficient way to distribute electric current along the length and height of a boat hull construction. These charge distribution layers are not specifically intended to improve the conduction in the direction through the thickness of the conductive layer, but to distribute the electric charge throughout the total area of the boat hull. With continued reference to FIG. 1, the layer 20 is connected in electrical communication with a conductor 50 which, in turn, is connected to a source of electric power 56. The source of electric power, as described in many of the patents identified above, typically is a current source that is connected to one or more batteries and which provide current to the conductive hull surface. As also described in the patents identified above, the source of power 56 can alternate the flow of electrons to two or more portions of the hull in order to alternately connect them as anodes or cathodes on the electrical system. This creates the desired surface effect in the water next to the submerged surfaces for all portions of the hull. In operation, electric current is conducted through the conductor 50 to the charge distribution layer 40. The charge distribution layer distributes the current along the length and height of the hull. The current is then conducted through the thickness of the layer 20 from the charge distribution layer 40 to the wetted surface 26 of the layer 20.

In order to fully understand the preferred embodiment of the present invention, certain terms must be defined. In the terminology used herein, the word "nanoparticle" is used to refer to a particle which has a minimum dimension which is less than one micron and, in particularly preferred embodiments of the present invention, is less than 100 nanometers. These nanoparticles can be nanotubes, ferrules, or other particles of different shapes. In the case of nanotubes, the particle can be much longer than its diameter. The minimum dimension would be the diameter when the terminology used herein is applied to nanotubes. With reference to ferrules, or generally spherical particles, the minimum dimension would typically be its diameter or minor access if not perfectly spherical.

A charge distribution layer 40 can be made of several different materials. A carbon fiber mat can be used. The mat can be saturated with the nanoparticle-bearing matrix or polymer and then applied to a boat hull mold. Typically, the mat would then be rolled against the surface of the mold to flatten it and further saturate it entirely. Prior to the placement of the saturated carbon fiber mat onto the mold, an initial layer of nanoparticle-bearing polymer is sprayed to create the outermost surface of the layer 20. The charge distribution layer 40 can alternatively be a screen or other electrically conductive object that serves the purpose of facilitating the conduction of electrons in a left and right direction in FIG. 1 in order to assure that all portions of the hull receive the flow of current. The conduction of current in an outer direction through the thickness of the layer 20 is facilitated by the presence of the electrically conductive nanoparticles described above. This direction of current flow is from the charge distribution layer 40 toward the water that is in contact with the outer surface 26.

Figure 2:
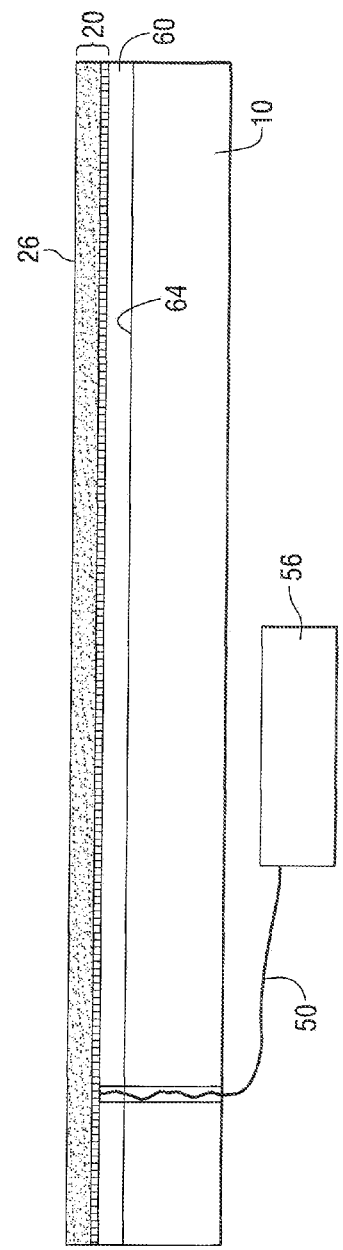
FIG. 2 is generally similar to FIG. 1, but shows the embodiment of the present invention used in conjunction with an electrically conductive hull.

FIG. 2 shows an alternative embodiment of the present invention which is generally intended for use on marine vessels or other submerged objects which are made of an electrically conductive support structure 20. If, for example, the electrically conductive support structure 10 is a steel or aluminum hull of a marine vessel, an electrically insulative layer 60, such as fiberglass or other non-conductive polymer material, is disposed on an outer surface 64 of the support structure 10 prior to disposing the layer 20 on it. The presence of the non-conductive layer 60 between the layer 20 and the support structure 10 insulates layer 20 from the metallic hull and facilitates this operation. The other components shown in FIG. 2 are generally similar to those described above in conjunction with FIG. 1.

Figure 3:
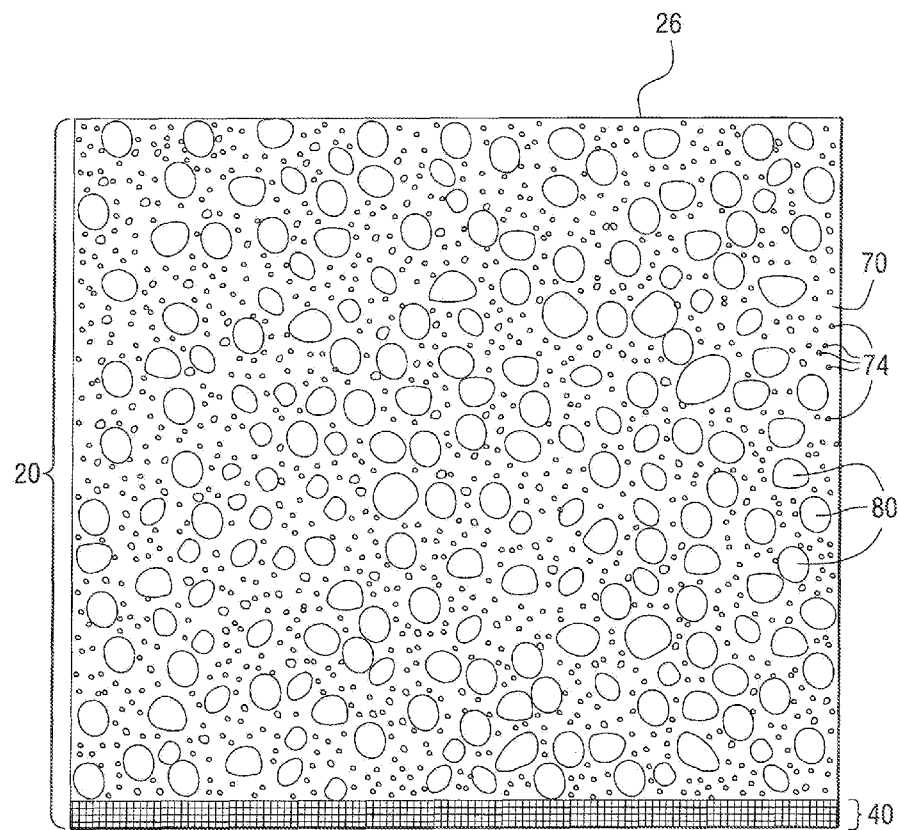
FIG. 3 shows an alternative embodiment of the present invention in which larger particles are combined with nanoparticles within a conductive layer.

FIG. 3 is an enlarged view of a section of the layer 20 made in accordance with an alternative embodiment of the present invention. The mesh or screen used to provide the charge distribution layer 40 is shown at the bottom portion of the illustration in FIG. 3. The wetted surface 26 is shown at the top. The support structure 10 and insulative layer 60 described above in conjunction with FIGS. 1 and 2 are not shown in FIG. 3. The polymer binder 70 has a plurality of electrically conductive nanoparticles 74 suspended within it. The embodiment shown in FIG. 3 also has a plurality of electrically conductive particles 80 suspended in the binder. The particles 80 are not nanoparticles in a preferred embodiment of the present invention but, instead, are larger particles which comprise carbon powder or carbon fibers. These larger particles 80 provide a portion of the conductivity needed to conduct an electric current through the thickness of the layer 20 from the charge distribution layer 40 to the wetted surface 26. The larger particles 80 are also less expensive than the nanoparticles 74. However, both the larger particles 80 and the nanoparticles 74 contribute to form a plurality of electrically conductive paths from the charge distribution layer 40 to the wetted surface 26. These current paths, through the thickness of the layer 20, are significantly improved because of the homogeneity and improved uniformity of the distribution of conductive particles (both the larger particles 80 and the nanoparticles 74) suspended in the binder 70. It should be understood that the representations illustrated in FIGS. 1-3 are not drawn to scale because of the extreme differences in dimensions between the macro components and the nanoparticles.

With continued reference to FIGS. 1-3, in a preferred embodiment of the present invention, the nanoparticles 74 comprise a percentage, by weight, of between one and twenty. When used in combination with larger particles 80, the layer 20 comprises a percentage of larger particles between zero and sixty, by weight. Although the precise percentage of nanoparticles and larger particles can vary in alternative embodiments of the present invention, it has been found that an effective conductive surface can be achieved with the percentages described above while also maintaining the cost of the structure at reasonable levels.

Figure 4:
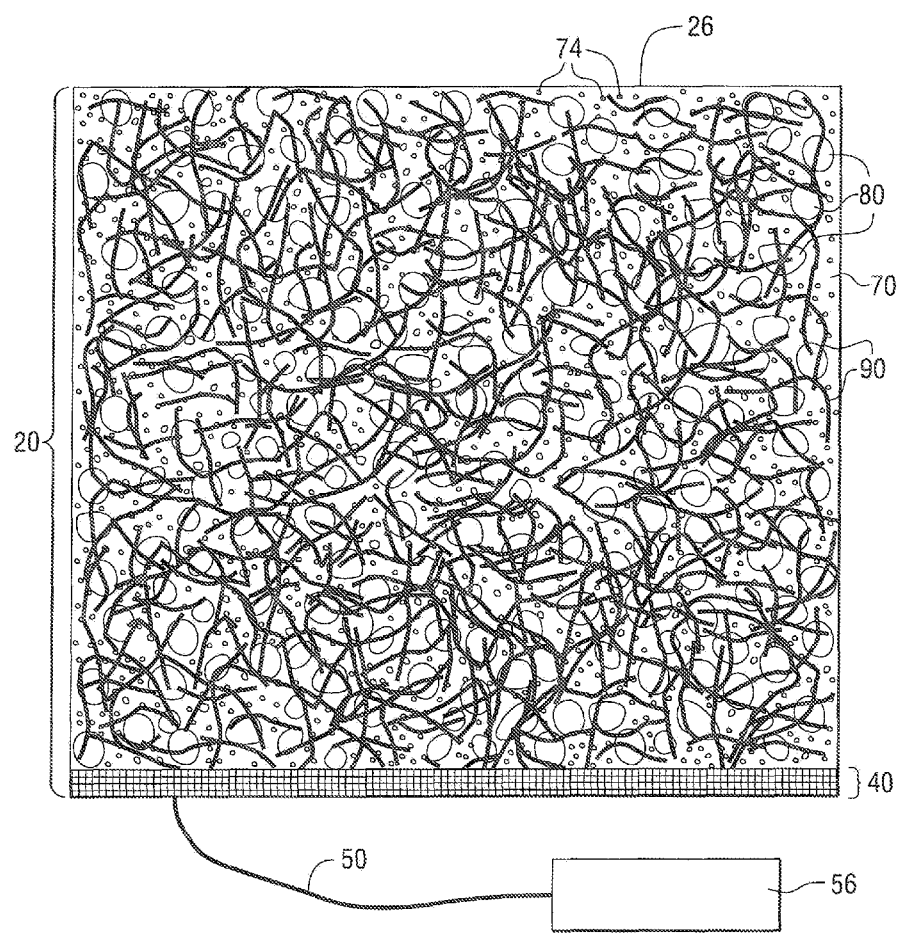
FIG. 4 is generally similar to FIG. 3, but shows the addition of electrically conductive fibers within the binder of the conductive layer.

FIG. 4 shows an alternative embodiment of the present invention. The layer 20 comprises the larger particles 80 and nanoparticles 74 suspended in a polymer matrix 70 as described above. In addition, it comprises carbon fibers 90 to facilitate the electrical conduction between the charge distribution layer 40 and the wetted surface 26 while maintaining a reasonable cost of the layer 20.

With continued reference to FIG. 4, it should be understood that the nanoparticles 74 act in a way that is generally analogous to fine particle sand being mixed in with larger rocks which are analogous to the larger particles 80. In addition, the fibers 90 provide conductive structures that are, like the particles 80, electrically conductive and less expensive than the nanoparticles 74. All of these particles conduct electric current between the charge distribution layer 40 and the wetted surface 26, but the nanoparticles 74 fill in gaps between the larger particles that could otherwise increase the overall resistance of the current path from the charge distribution layer 40 to the wetted surface 26.

One of the primary advantages of a preferred embodiment of the present invention is that it improves the uniformity of electrical conductivity of the layer 20. In doing so, the presence of electrically conductive nanoparticles reduces the likelihood of localized hot spots that can result in burn-out in regions of the conductive surface.

Various embodiments of the present invention have been described above. The binder can be a polymer matrix. The polymer can be a gel coat or other type of resin material. It can be electrically insulative, prior to the addition of the electrically conductive nanoparticles, or it can be electrically conductive prior to this mixture. The electrically conductive nanoparticles can comprise a plurality of nanotubes, ferrules, or other nanoparticles which are electrically conductive. The inclusion of other particles, having minimum dimensions greater than 100 nanometers, to facilitate electrical conduction and reduce the overall cost of the layer. The electrically conductive nanoparticles can comprise graphite or carbon nanoparticles or, in alternative embodiments, ceramic nanoparticles. The layer can comprise a charge distribution layer which is sometimes referred to as a ground plane to distribute the electric current throughout the entire conductive layer.

A submerged object made in accordance with preferred embodiments of the present invention comprises a support structure 10 which can be a fiberglass hull, a metallic hull, or the structure of a grate. A layer 20 is disposed on the support structure 10. The layer has a surface 26 which is disposable in contact with water when the object is submerged. The layer 20 comprises a binder, such as a polymer 70 and a plurality of electrical conductive nanoparticles 74 suspended within the binder. The binder can be a polymer matrix, such as a resin. It can be gel coat in certain embodiments of the present invention. The plurality of electrically conductive nanoparticles 74 can comprise a plurality of carbon nanotubes or carbon ferrules. Alternatively, the plurality of electrically conductive nanoparticles can comprise a plurality of electrically conductive ceramic nanoparticles. The binder can be an electrically conductive polymer, such as electrically conductive gel coat. The support structure 10 can be the hull of a marine vessel. In certain embodiments of the present invention, a plurality of conductive particles 80 can also be suspended within the binder 70. Each of the plurality of conductive particles is larger than the nanoparticles and has a minimum dimension which is typically greater than 100 nanometers. The plurality of conductive particles 80 can comprise carbon powder or carbon fibers. Certain embodiments of the present invention also comprise a charge distribution member 40 which can be a carbon mat or an electrically conductive mesh or screen. In a particularly preferred embodiment of the present invention, each of the plurality of electrically conductive nanoparticles 74 has a minimum dimension which is less than 100 nanometers.

Although the present invention has been described with particular specificity and illustrated to show several preferred embodiments, it should be understood that alternative embodiments are also within its scope.

We claim:

1. An object having a surface that is submergible, comprising:
   a support structure; and
   a layer disposed on said support structure, said layer having a surface which is disposable in contact with water when said object is submerged, said layer comprising a binder and a plurality of electrically conductive nanoparticles suspended within said binder,
   wherein
   said plurality of electrically conductive nanoparticles comprises a plurality of carbon ferrules.

2. An object having a surface that is submergible, comprising:
   a support structure;
   a layer disposed on said support structure, said layer having a surface which is disposable in contact with water when said object is submerged, said layer comprising a polymer matrix and a plurality of electrically conductive nanoparticles suspended within said polymer matrix; and
   a charge distribution member disposed within said polymer matrix,
   wherein:
   said plurality of electrically conductive nanoparticles is selected from the group consisting of a plurality of carbon nanotubes, a plurality of carbon ferrules and a plurality of electrically conductive ceramic nanoparticles;
   said polymer matrix is an electrically conductive polymer;
   said polymer matrix is an electrically conductive gel coat material.

3. The object of claim 2, wherein:
   said support structure is a hull of a marine vessel.

4. An object having a surface that is submergible, comprising:
   a support structure;
   a layer disposed on said support structure, said layer having a surface which is disposable in contact with water when said object is submerged, said layer comprising a binder and a plurality of carbon nanotubes, each of said plurality of carbon nanotubes being suspended within said binder and having a minimum dimension which is less than 100 nanometers;
   a plurality of conductive particles suspended within said binder, each of said plurality of conductive particles having a minimum dimension greater than 100 nanometers; and
   a charge distribution member disposed within said binder, wherein:
   said binder is a polymer matrix;
   each of said plurality of carbon nanotubes has a minimum dimension less than 50 nanometers;
   said polymer matrix is an electrically conductive gel coat material.

5. An object having a surface that is submergible, comprising:
   a support structure;
   a layer disposed on said support structure, said layer having a surface which is disposable in contact with water when said object is submerged, said layer comprising a binder and a plurality of carbon nanotubes, each of said plurality of carbon nanotubes being suspended within said binder and having a minimum dimension which is less than 100 nanometers;
   a plurality of conductive particles suspended within said binder, each of said plurality of conductive particles having a minimum dimension greater than 100 nanometers; and
   a charge distribution member disposed within said binder, wherein:
   said binder is a polymer matrix;
   each of said plurality of carbon nanotubes has a minimum dimension less than 50 nanometers;
   said support structure is a hull of a marine vessel.

* * * * *